US012554846B2

(12) United States Patent
Nandan et al.

(10) Patent No.: US 12,554,846 B2
(45) Date of Patent: Feb. 17, 2026

(54) IDENTIFYING ATYPICAL ACTIVITY INVOLVING AN ENTITY IN A COMPUTER SYSTEM

(71) Applicant: Crowdstrike, Inc., Sunnyvale, CA (US)

(72) Inventors: Manu Nandan, Frisco, TX (US); Michael Brautbar, Wayland, MA (US)

(73) Assignee: Crowdstrike, Inc., Sunnyvale, CA (US)

( * ) Notice: Subject to any disclaimer, the term of this patent is extended or adjusted under 35 U.S.C. 154(b) by 17 days.

(21) Appl. No.: 18/789,389

(22) Filed: Jul. 30, 2024

(65) Prior Publication Data

US 2026/0037621 A1 Feb. 5, 2026

(51) Int. Cl.
*G06F 21/55* (2013.01)
*G06N 5/04* (2023.01)

(52) U.S. Cl.
CPC ............ *G06F 21/554* (2013.01); *G06N 5/04* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,148,441 B1 * | 9/2015 | Tamersoy | G06F 21/566 |
| 10,476,753 B2 * | 11/2019 | Chen | H04W 12/67 |
| 10,539,881 B1 * | 1/2020 | Sha | G03F 7/70433 |
| 2017/0032273 A1 * | 2/2017 | Ho | G06N 7/01 |
| 2017/0063909 A1 * | 3/2017 | Muddu | G06F 3/0484 |
| 2017/0353477 A1 * | 12/2017 | Faigon | G06F 21/6209 |
| 2018/0150744 A1 * | 5/2018 | Orr | G06N 3/08 |
| 2022/0374524 A1 | 11/2022 | Pandey et al. | |
| 2023/0229570 A1 * | 7/2023 | Cepek | G06N 3/045 |

FOREIGN PATENT DOCUMENTS

| | | | |
|---|---|---|---|
| CN | 112632535 A | 4/2021 | |
| CN | 115883213 A | 3/2023 | |
| EP | 3416068 A2 * | 12/2018 | G06F 16/9024 |

OTHER PUBLICATIONS

Cai, L. et al., "Structural Temporal Graph Neural Networks for Anomaly Detection in Dynamic Graphs," arXiv:2005.07427v2 [cs. LG], 2020, 7 pages.

* cited by examiner

*Primary Examiner* — Paul R Fisher
(74) *Attorney, Agent, or Firm* — Elliott, Ostrander & Preston, P.C.

(57) ABSTRACT

Timestamped events involving entities occurring over a time period are maintained in a graph where each node represents a respective entity and edges connected to a node represent corresponding timestamped events involving the entity represented by the node. A respective array of values corresponding to the edges is created for each node. A number of embedding vectors is created for each node, each comprising numerical values corresponding to a portion of the respective array of values for the node for a portion of the time period of timestamped events involving the entity represented by the node. Similarity is measured in the numerical values of one of the embedding vectors relative to the numerical values of another one or more of the embedding vectors obtained for the node. An action is taken with regard to the entity represented by the node responsive to the measured similarity.

20 Claims, 6 Drawing Sheets

IDENTIFYING ATYPICAL ACTIVITY INVOLVING AN ENTITY IN A COMPUTER SYSTEM

TECHNICAL FIELD

Embodiments of the present disclosure relate to digital computing systems, particularly to identifying anomalous or malicious activity involving an entity in a computing system.

BACKGROUND

Organizations have many physical and/or virtual entities using computing resources, such as client computing devices, servers, network resources, and virtual instances of the same. Entities may also be user logins of the organization's members, or client computing devices connected to the organization's network resources, such as the organization's servers. To prevent misuse of the computing resources by a malicious actor that, for example, obtained a member's login credentials, or by malicious software installed on a computer, security analysts typically rely on alerts triggered by rules. Such rules are based on events associated with a computing resource, such as an event associated with a user account, a user login, a client computing device, a server, or a network resource.

The type of events and their volume depend on the domain of interest. For example, for events related to an organization's cloud resources, such as Amazon Web Services (AWS), Google Cloud Platform (GCP), or Microsoft Azure, every action taken on or by all users or computer instances may be logged and the logged data thus may be extremely large for organizations with a large cloud footprint. Another example of the type and volume of events is computer endpoint or client computing device security, where all activity in an organization's computer network is logged. This domain of interest too may create very large event logs for an organization. The rules may be manually created, such as triggering an alert if a user terminates an Amazon Elastic Compute Cloud (EC2) instance, or the rules could be based on some pattern of events that are identified using some algorithm such as a machine learning algorithm.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
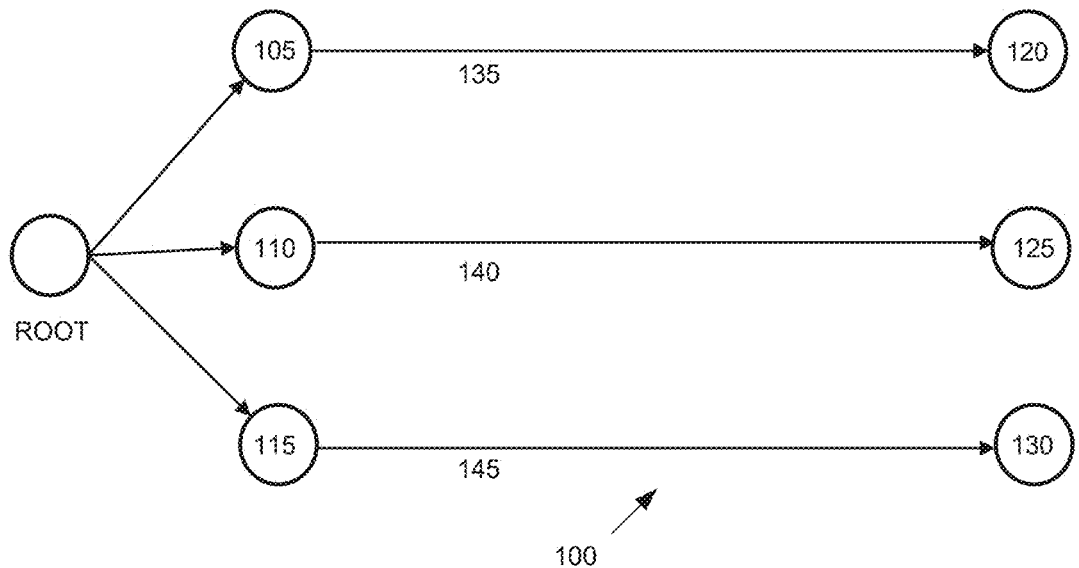
FIG. 1 illustrates a graph data structure as may be used by the disclosed embodiments.

Organizations have many physical and/or virtual entities using computing resources. Entities may also be user logins of the organization's members, or client computing devices connected to the organization's network resources. To prevent misuse of the computing resources by a malicious actor or by malicious software installed on a computer, security analysts typically rely on alerts triggered by rules. Such rules are based on events associated with a computing resource.

The type of events and their volume depend on the domain of interest. The domain of interest may create very large event logs for an organization. The rules may be manually created, or the rules could be based on some pattern of events that are identified using some algorithm such as a machine learning algorithm. These rules are meant to be general and applied to all entities. However, these rules are static and must be updated or modified manually.

While rules are effective in capturing well established patterns of cybersecurity attacks or malicious actions, rules require considerable effort to update and maintain. In addition, expert threat actors constantly try to evade alerts based on such rules by avoiding the well-known patterns as much as possible. Security analysts can greatly benefit from an algorithm that can indicate which user accounts or computing resources might be engaged in malicious activity and that does not rely on rules. Such an algorithm can complement rule-based detection systems and provide early indicators of attack or malicious activity. The entities identified as being involved in the malicious activity can then be further analyzed by security analysts to get details of a possible attack and take remediation steps as may be needed. The disclosed embodiments involve minimal effort to adapt to an organization's computing systems and generate a score of atypical activity for each entity based on a history of events involving the entity, unlike rules which are static and independent of the entity.

In addition, the disclosed embodiments can provide an indicator of attack or possible malicious activity that can help security analysts shortlist entities to analyze after an alert is triggered. The indicator may be relevant even if the alert is for one user account or computing resource since multiple user accounts and/or computing resources might or will be compromised and used in the same attack without triggering alerts. Current solutions do not directly address this issue as they look at individual events rather than looking at all events involving an entity over a selected time period.

The disclosed embodiments can generate a score for uncharacteristic or divergent entity activity. The embodiments provide a general-purpose algorithm that can work on any computer system that keeps logs of events related to activities undertaken by or involving entities, for example: (1) cloud-based entities such as an organization's Amazon Web Service (AWS) accounts and resources, or (2) non-cloud-based entities such as an organization's internal network/on-site physical computing resources and user accounts.

Advantageously, only minimal information about the occurrence of an event such as which entity or entities are involved and a unique identifier describing the event is used according to the disclosed embodiments. Once this minimal information is provided, the event data from an organization can be processed according to the disclosed embodiments to generate a score of atypical activity for the one or more entities. Any entity with a high score may be an indication that the entity is involved in anomalous or malicious activity. A high score may merit further analysis by cyber security personnel, or cause embodiments to generate threat detection rules logic to be executed by an entity to counter or pre-empt the occurrence of new or repeated but previously undetected attacks or malicious or anomalous activity.

According to the disclosed embodiments, events are typically of the following type: a specific action was performed by one entity on another. For example, in an AWS environment, a first user (a first entity) might start a remote computer (a first event or action) such as an EC2 instance (a second entity). As another example, in a non-cloud environment, a first user (a first entity) might install a program (a first event or action) on their laptop (a second entity).

A collection of such events from an organization can be considered and maintained as a graph data structure, or simply, a graph, where nodes in the graph are entities and the edges between nodes in the graph represent actions between the nodes. Only entities that have an action that occurs between or involving them have an edge between them in the graphical representation. FIG. 1 illustrates a simple graph data structure 100 in which there are three entities that are user accounts represented by nodes 105, 110 and 115, and another three entities that are computing resources represented by nodes 120, 125 and 130. In this example, a user with user account 105 logs into computing resource 120. That login event is maintained in edge 135 of the graph. Likewise, the user with user login account 110 logins into computing resource 125, as indicated in the graph by edge 140, and the user with login account 115 logs into computing resource 130, as indicated by edge 145 in the graph. The origin nodes for each edge in the graph is the originator of the corresponding events, e.g., the user account nodes 105, 110 and 115 in this example, and the destination nodes are the computing resources on which the actions or events are performed, e.g., computing resource nodes 120, 125 and 130 in this example.

The edges 135, 140 and 145 that respectively connect origin nodes 105, 110 and 115 to destination nodes 120, 125 and 130 can contain information such as a time (or timestamp) of the corresponding event, any errors (for example, exceptions) resulting from the action or event and any other relevant information.

In the graph depicted in FIG. 1, all information about the actions or events is represented in the respective edges connecting two entities. The graph can be improved by condensing or collapsing edges for similar or the same types of actions or events between entity nodes as shown in graph 200 in FIG. 2. In this example, events or actions may be represented by nodes such as nodes 135 and 140, rather than edges. In this example graph data structure 200, there are three entities that are user accounts represented by nodes 105, 110 and 115, and another three entities that are computing resources represented by nodes 120, 125 and 130. In this example, a user with user account 105 performs an event or action in connection with computing resource 120 (e.g. a login event). That event is maintained in node 135 of the graph. A first timestamp (e.g., time=t1) is associated with the edges 150 and 152 that connects nodes 105, 135 and 120 to indicate the time at which the event between nodes 105 and 120 occurred. Likewise, the user with user account 110 performs an event or action in connection with computing resource 125 (e.g., a file copy event). That event is maintained in node 140 of the graph, which is a different node than node 135 to indicate the event (e.g., a file copy event) is a different type of event than the event maintained in node 135 of the graph (e.g., the login event). A second timestamp (e.g., time=t2) is associated with edges 155 and 157 that connect nodes 110, 140 and 125 to indicate the time at which the event between nodes 105 and 125 occurred. Similarly, the user with user account 115 performs an event or action in connection with computing resource 130. That event is maintained in node 140 of the graph, which is the same node 140 to indicate that the event is the same type of event as the event that occurred between nodes 110 and 125 (e.g., the file copy event). However, a third timestamp (e.g., time=t3) is associated with edges 160 and 162, which is different than the second timestamp associated with edges 155 and 157, to indicate the time at which the same type of event that occurred between nodes 110 and 125 occurred at a different time between nodes 115 and 130.

Figure 2:
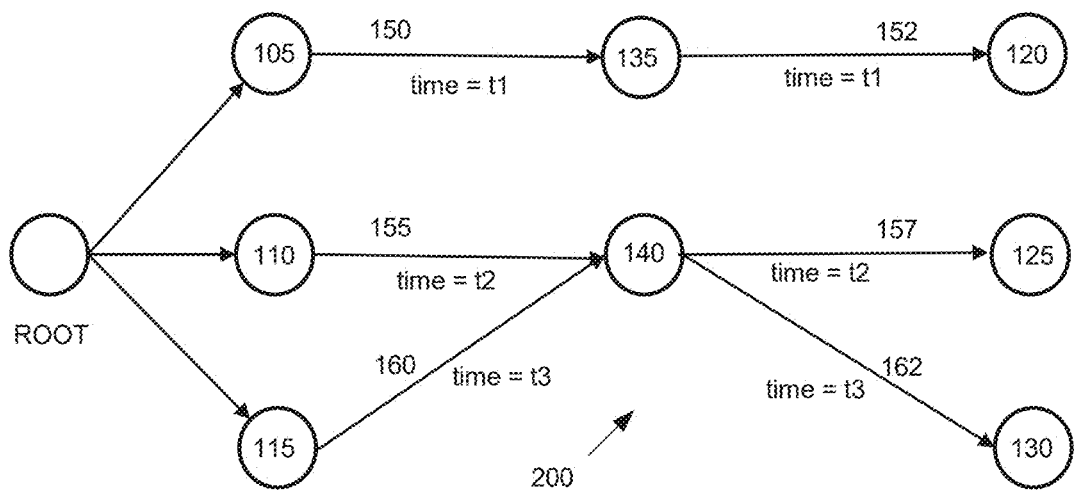
FIG. 2 illustrates a graph data structure as may be used by the disclosed embodiments.
Figure 3:
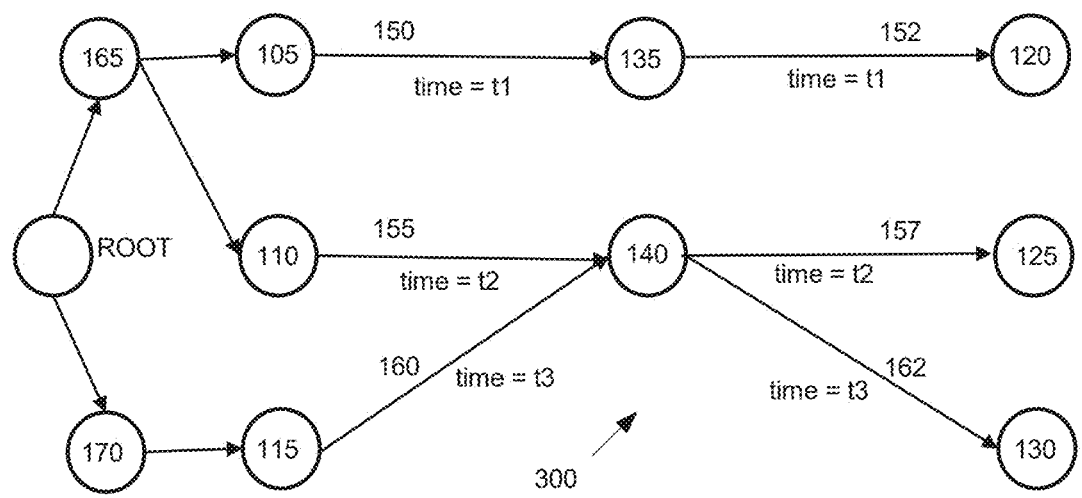
FIG. 3 illustrates a graph data structure as may be used by the disclosed embodiments.

The graphs illustrated in FIGS. 1 and 2 can be further expanded to include more nodes to represent other information, for example, user and/or computing resource location (e.g., respective IP addresses). For example, the graph 300 illustrated in FIG. 3 includes nodes 165 and 170 which respectively represent different locations for user accounts represented by nodes 105, 110 and 115. As illustrated, user accounts represented by nodes 105 and 110 are located at the same location (e.g., the same IP address) as indicated by node 165, whereas the user account represented by node 115 is in a different location as indicated by the node 170 that represents a different location than node 165.

Figure 4:
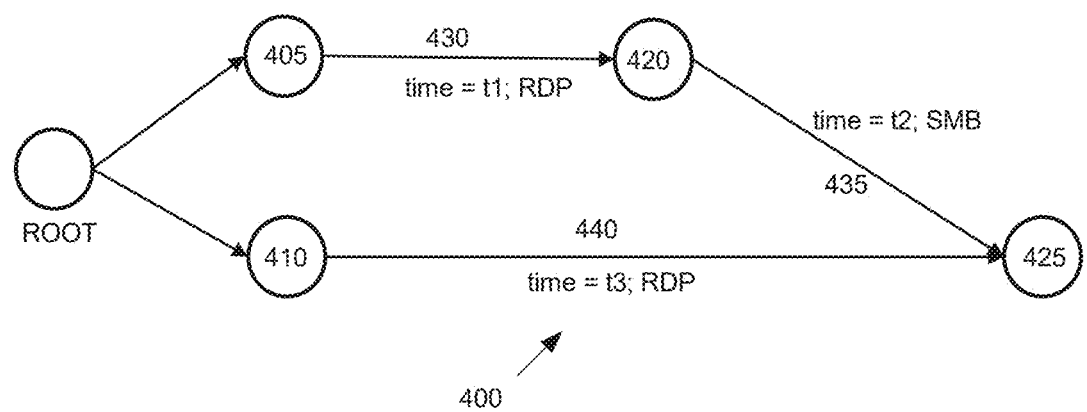
FIG. 4 illustrates a graph data structure as may be used by the disclosed embodiments.

FIG. 4 illustrates a graph 400 that tracks on-premises network activity. Consider the following example events in an organization's computer network. A user associated with a first user account, represented by node 405 in graph 400, first logs into a host represented by node 420 (using, for example, the RDP protocol) at a first time=t1 (represented by edge 430) and then transfer files to another host represented by node 425 (using, for example, the SMB protocol) at a subsequent time=t2 (represented by edge 435). Sometime later (at time=t3 represented by edge 440) another user associated with a different user account represented by node 410 logs into the second host 425 (using, for example, the RDP protocol), where they can access those same files. Such events naturally represent a graph that can be expressed and stored in a graph data structure as shown in the graph data structure 400 in FIG. 4. The disclosed embodiments can process such events from one or more source or origin nodes in the graph data structure and identify entities that have unusual or atypical actions or events associated with them.

Graphical Neural Networks (GNNs) excel at processing data that is in a graphical format. To process graphs with time information such as illustrated in the example graphs 100, 200, 300 and 400 in FIGS. 1-4, a type of GNN called a Temporal Graph Neural Network (TGN) may be used. A TGN is a self-supervised GNN model that trains itself to predict existing edges with high probability and non-existing (random) edges with low probability. The TGN model does this by internally generating an embedding representation for each node that is a vector of numbers computed based on all the edges connected to that node. In simplified terms, the node embeddings can be thought of as a numerical summary of all the edges connected to that node which represent all the events associated with the entity corresponding to the node.

In general, computing or generating a score that reflects an atypical entity activity or event is based on the change in node embeddings over time intervals, for example, over fixed time intervals. Specifically, given embeddings E collected at a latest time period for an entity X and those collected for the previous N time periods {E0, E1, E2, . . . , En−1}, the disclosed embodiments measure a deviation of E from {E0, E1, E2, . . . , En−1} by finding the Ei (where i=0, 1, 2, . . . , n−1) that is most similar to E. If E is very different from all, or even a plurality, of {E0, E1, E2, . . . , En−1}, then the atypical activity score is high, otherwise the score is low. By looking for similarity in embeddings over multiple time periods in the past, any deviation in embeddings due to innocuous changes in behavior, such as running some commands only once a week, will not result in a high score.

According to the disclosed embodiments, the atypical activity score is specific to each entity based on events in the past, enabling identification of cases such as hijacked user accounts, where malicious activity has started by execution of events that are uncharacteristic to a user, but such activity has not yet triggered alerts based on any traditional rules.

In general, embodiments of the present disclosure keep track of timestamped events involving entities occurring over a time period. These timestamped events are maintained in a graph where each node represents a respective entity and edges connected to a node represent corresponding timestamped events involving the entity represented by the node. A respective array of values corresponding to the edges is created for each node. A number of embedding vectors is created for each node, each comprising numerical values corresponding to a portion of the respective array of values for the node for a portion of the time period of timestamped events involving the entity represented by the node. Similarity is measured in the numerical values of one of the embedding vectors relative to the numerical values of another one or more of the embedding vectors obtained for the node. An action is taken regarding the entity represented by the node responsive to the measured similarity. These embodiments are discussed in further detail below.

Figure 5:
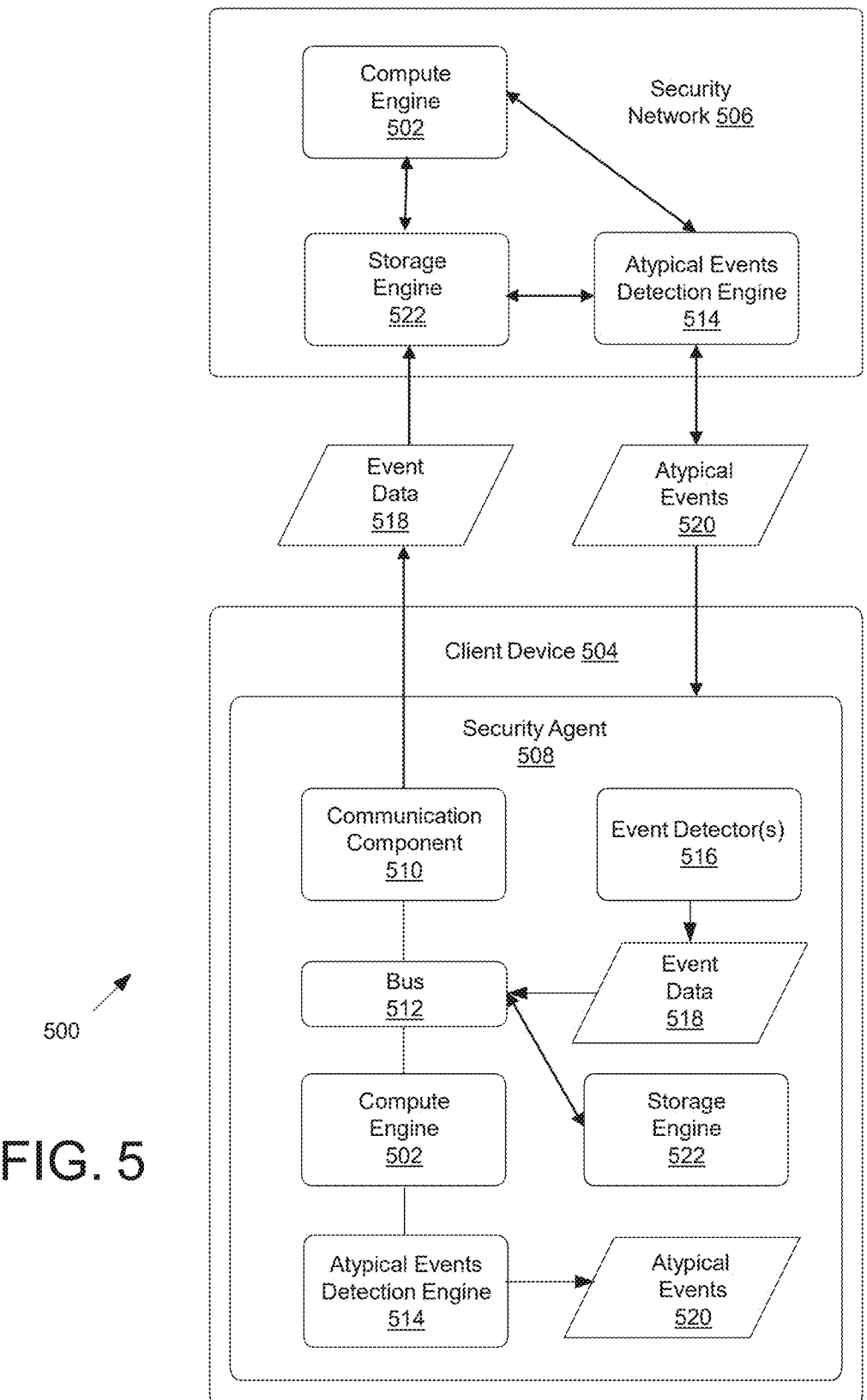
FIG. 5 illustrates an example architecture of a distributed security system in which embodiments of the present disclosure may be used.

FIG. 5 depicts an example of a distributed security system 500 in which embodiments of the present disclosure may be deployed. The distributed security system 500 can include distributed instances of a compute engine 502 that can run locally on one or more client computing devices 504, or simply, client devices 504, and/or in a security network 506. As an example, some instances of the compute engine 502 can run locally on client devices 504 as part of security agents, or sensors 508, executing on those client devices 504. As another example, other instances of the compute engine 502 can run remotely in a security network 506, for instance within a cloud computing environment associated with the distributed security system 500. The compute engine 502 can execute according to portable computer executable code that can run locally as part of a security agent 508, in a security network 506, and/or in other local or network systems that can also process event data as described herein.

Likewise, the distributed security system 500 can include distributed instances of an atypical events detection engine 514 that can run locally on one or more client devices 504, and/or in a security network 506. As an example, some instances of the atypical events detection engine 514, or portions thereof, can run locally on client devices 504 as part of security agents 508 executing on those client devices 504. As another example, other instances of the atypical events detection engine 514, or portions thereof, can run remotely in a security network 506, for instance within a cloud computing environment associated with the distributed security system 500. The atypical events detection engine 514 can execute according to portable computer executable code that can run locally as part of a security agent 508, in a security network 506, and/or in other local or network systems that can also process event data as described herein.

A client device 504 can include or be one or more computing devices. In various examples, a client device 504 can be a workstation, a personal computer (PC), a laptop computer, a tablet computer, a personal digital assistant (PDA), a cellular phone, a media center, an Internet of Things (IoT) device, a server or server farm, multiple distributed server farms, a mainframe, or any other sort of computing device or computing devices or combinations thereof. In some examples, a client device 504 can be a computing device, component, or system that is embedded or otherwise incorporated into another device or system. In some examples, the client device 504 can also be a stand-alone or embedded component that processes or monitors incoming and/or outgoing data communications. For example, the client device 504 can be a network firewall, network router, network monitoring component, a supervisory control and data acquisition (SCADA) component, or any other component. An example system architecture for a client device 504 is illustrated in greater detail in FIG. 5 and is described in detail below with reference to that figure.

The security network 506 can include one or more servers, server farms, hardware computing elements, virtualized computing elements, and/or other network computing elements that are remote from the client devices 504. In some examples, the security network 506 can be a cloud or a cloud computing environment. Client devices 504, and/or security agents 508 executing on such client devices 504, can communicate with elements of the security network 506 through the Internet or other types of network and/or data connections. In some examples, computing elements of the security network 506 can be operated by, or be associated with, an operator of a security service, while the client devices 504 can be associated with customers, subscribers, and/or other users of the security service.

As shown in FIG. 5, instances of the compute engine 502 can execute locally on client devices 504 as part of security agents 508 deployed as runtime executable applications that run locally on the client devices 504. Local instances of the compute engine 502 may execute in security agents 508 on a homogeneous or heterogeneous set of client devices 504. Similarly, instances of the atypical events detection engine 514 can execute locally on client devices 504 as part of security agents 508 deployed as runtime executable applications that run locally on the client devices 504. Local instances of the atypical events detection engine 514 may execute in security agents 508 on a homogeneous or heterogeneous set of client devices 504.

One or more cloud instances of the compute engine 502 can also execute on one or more computing elements of the security network 506, remote from client devices 504. The distributed security system 500 can also include a set of other cloud elements that execute on, and/or are stored in, one or more computing elements of the security network 506. For example, the cloud elements of the security network 506 can include an atypical events detection engine 514 and a storage engine 522, as discussed further below.

Local and/or cloud instances of the compute engine 502, and/or other elements of the distributed security system 500 such as atypical events detection engine 514, can process event data 518 about single events and/or patterns of events that occur on one or more entities in a computing system, including events that occur on or involving client devices 504, such as user logging into a client device or performing an action or operation in connection with the client device, such as an operating system or file system operation, or a network communication operation such as transmitting data from, or receiving data at, the client device. In general, events can include any observable and/or detectable type of computing operation, networking operation, behavior, or other action that may occur on or in connection with one or more user accounts or client devices 504. According to embodiments of the present disclosure, events can include events and behaviors such as command line events, process trees, or events associated with file system operations, including creating, downloading, uploading, reading, writing (or otherwise modifying), copying, importing, or exporting a file, or parts thereof, or moving the location of a file either within a file directory structure or to another file directory structure on the same or different client device 504. By way of non-limiting examples, an event may be a process that ran or executed a command, process, or executable file, or created a file, wrote to the file, and saved the file on the client device 504, or opened an existing file, modified the existing file, and/or saved the existing file under the same or different name and/or with the same or different file extension on the client device 504 or on another client device 504. In some examples, events based on other such observable or detectable occurrences can be or include physical and/or hardware events. For instance, the event may be that a Universal Serial Bus (USB) memory stick or other USB device was inserted in, or removed from, a client device 504, particularly when the event occurs in conjunction with recent file system operations such as dragging and/or dropping files between the USB device and a permanent storage device or other drive unit of the client device 504.

Events that occur on or in connection with one or more user accounts or client devices 504 can be detected or observed by event detectors 516 of security agents 508 on those client devices 504. For example, a security agent 508 may execute at a kernel-level and/or as a driver such that the security agent 508 has visibility into operating system activities from which one or more event detectors 516 of the security agent 508 can observe event occurrences or derive or interpret the occurrences of events. In some examples, the security agent 508 may load at the kernel-level at boot time of the client device 504, before or during loading of an operating system, such that the security agent 508 includes kernel-mode components such as a kernel-mode event detector 516. In some examples, a security agent 508 can also, or alternately, have components that operate on a computing device in a user-mode, such as user-mode event detectors 516 that can detect or observe user actions and/or user-mode events.

When an event detector 516 of a security agent 508 detects or observes a behavior or other event that occurs in connection with a user account or on a client device 504, the security agent 508 can place corresponding event data 518 about the event occurrence on a bus 512 or other memory location. For instance, in some examples the security agent 508 may have a local version of a storage engine 522 described herein below or have access to other local memory on the client device 504, where the security agent 508 can at least temporarily store event data 518. The event data 518 on the bus 512, or stored at another memory location, can be accessed by other elements of the security agent 508, including an instance of the compute engine 502, and/or a communication component 510 that can send the event data 518 to the security network 506, and/or an instance of atypical events detection engine 514.

Each security agent 508 can have a unique identifier, such as an agent identifier (AID). Accordingly, distinct security agents 508 on different client devices 504 can be uniquely identified by other elements of the distributed security system 500 using an AID or other unique identifier, or a combination of an AID and another unique identifier, such as a client device identifier or network and/or IP address associated with the client device. In this manner, event data 518 and/or atypical event data 520, for example, related to unusual or atypical user logins, command line events, process trees, or file system operations involving one or more files, can be associated with a particular client device and/or security agent or user account.

In some examples, event data 518 about events detected or observed locally on a client device 504 or in connection with user accounts, can be processed locally by a compute engine 502 and/or other elements of a local security agent 508 executing on that client device 504. However, in some examples, event data 518 about locally occurring events can also, or alternately, be sent by a security agent 508 on a client device 504 to the security network 506, such that the event data 518 can be processed by a cloud instance of the compute engine 502 and/or other cloud elements of the distributed security system 500, such as atypical events detection engine 514. Accordingly, event data 518 about events that occur locally on client devices 504 or in connection with user accounts can be processed locally by security agents 508, be processed remotely via cloud elements of the distributed security system 500 or be processed by both local security agents 508 and cloud elements of the distributed security system 500.

The storage engine 522 can process and/or manage event data 518 that is sent to the security network 506 by client devices 504. In some examples, the storage engine 522 can receive event data 518 from security agents 508 provided by an operator of a security service that also runs the security network 506. However, in other examples, the storage engine 522 can also receive and process event data 518 from any other source, including an instance of compute engine 502 executing in security network 506, an instance of the atypical events detection engine 514 executing in security network 506, security agents 508 associated with other vendors or streams of event data 518 from other providers.

The storage engine 522 can operate on event data. In particular, storage engine 522 can sort incoming event data 518, route event data 518 to corresponding instances of the compute engine 502, store event data 518 in short-term and/or long-term storage, output event data 518 to other elements of the distributed security system 500, such as instances of the atypical events detection engine 514, and/or perform other types of storage operations.

A compute engine 502 in the distributed security system 500 can process a stream of event data 518. The event data 518 may have originated from an event detector 516 of a security agent 508 that initially detected or observed the occurrence of an event on a client device 504 or in connection with activities or events involving one or more user accounts, and/or may be event data 518 that has been produced by a different instance of the compute engine 502. In a local instance of the compute engine 502 (i.e., an instance of compute engine 502 operating on a client device 504), in some examples the event stream may be received from a bus 512 or local memory on a client device 504. In a cloud instance of the compute engine 502, in some examples the event stream may be received via the storage engine 522.

The compute engine 502 can generate a result from event data 518 in a stream of event data. For example, if the stream includes event data 518 indicating that one or more events occurred that match a behavior pattern, the compute engine 502 can generate and output a result indicating that there is a match with the behavior pattern. In some examples, the result can itself be new event data 518 specifying that a behavior pattern has been matched, and/or, for example, the result can be a feature vector associated with the event, as described further below. The generated results may be stored in storage engine 522, for example, for subsequent input to an instance of compute engine 502 or an instance of atypical events detection engine 514.

According to embodiments of the present disclosure, an input stream of event data 518 can be sent to the security network 506 by one or more local security agents 508. Such an input stream of event data 518 can be received by a storage engine 522 in the security network 506, as shown in FIG. 5. In some examples, security agents 508 can send event data 518 to the security network 506 over a temporary or persistent connection, and a termination service or process of the distributed security system 500 can provide event data 518 received from multiple security agents 508 to the storage engine 522 as an input stream.

The event data 518 in the input stream may be in a random or pseudo-random order when it is received by the storage engine 522 in the security network 506. For example, event data 518 for different events may arrive at the storage engine 522 in the input stream in any order without regard for when the events occurred on client devices 504 or in connection with one or more user accounts. As another example, event data 518 from security agents 508 on different client devices 504 or associated with different user accounts may be mixed together within the input stream of event data when they are received at the storage engine 522, without being ordered by identifiers of the security agents 508. However, the storage engine 522 can perform various operations to sort, route, and/or store the event data 522 within the security network 506.

Figure 6:
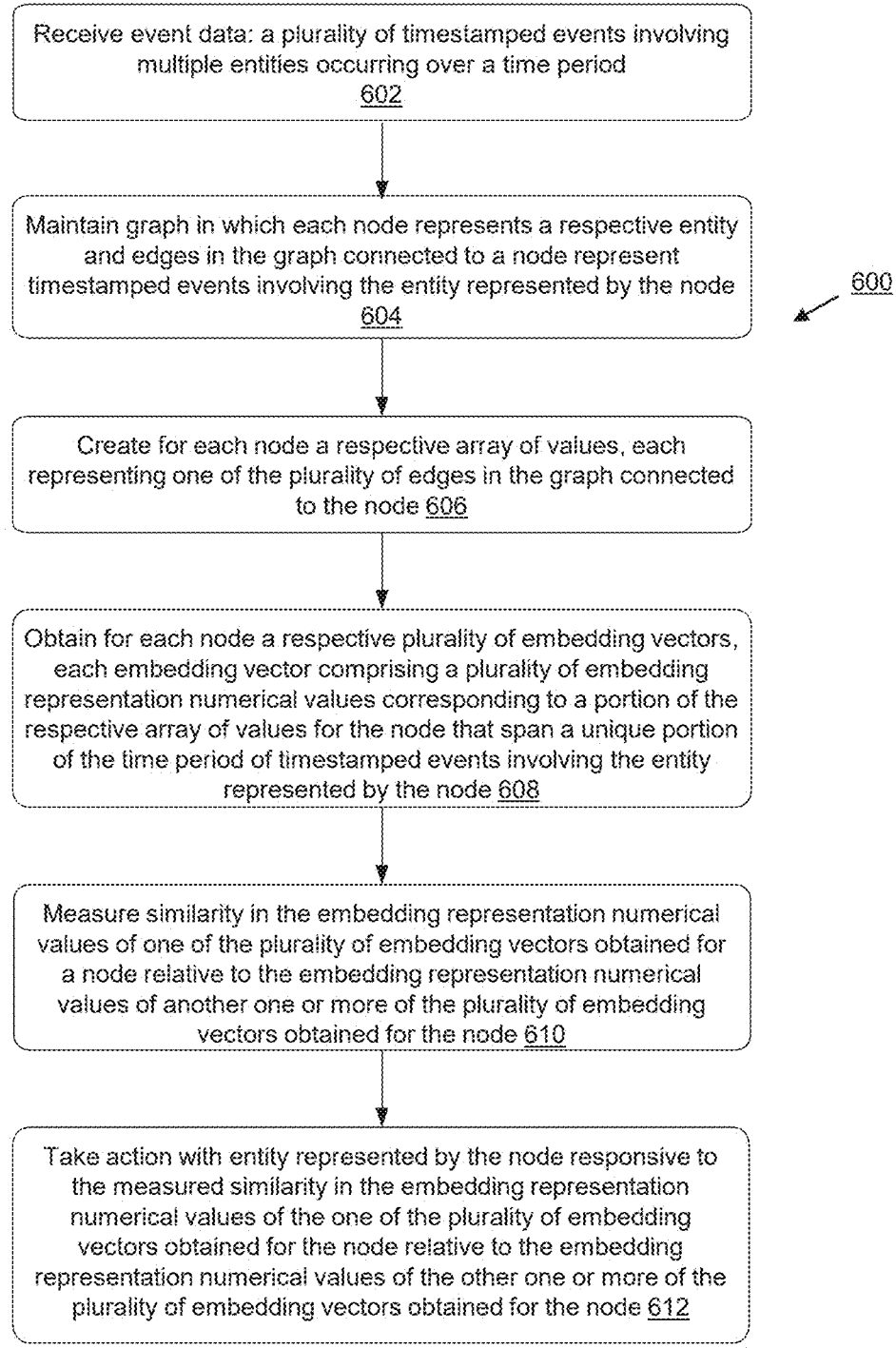
FIG. 6 illustrates a flowchart of a method to detect atypical events relating to an entity in a computing system according to example embodiments of the present disclosure.

With reference to the flowchart 600 in FIG. 6, a method to identify an atypical event involving an entity in a computing system, according to the disclosed embodiments, is discussed below. An entity in the computing system may be, for example, a user login to the computing system, a user account in the computing system, a computing resource of the computing system, a cloud-based user account in a cloud-based computing system, a virtual computing resource in a cloud-based computing system, a network resource in a computing system or a cloud-based computing system, and a location of the entity in the computing system.

At block 602, a compute engine 502 receives event data. For example, the compute engine receives a continuous stream of event data. The event data comprises a plurality of timestamped events involving entities in computing system, such as client devices 504, user accounts, network resources, cloud resources, etc., that occur over a time period. In one embodiment, the plurality of timestamped events involving the plurality of entities each comprises an entity identifier, an event identifier or event type identifier, and a corresponding timestamp at which the entity identified by the entity identifier was involved in an event identified by the event identifier or event type identifier.

The time period may be selected or confined, such as a number of hours, a number of days, a number of weeks, or even longer time periods, such as a number of months. At block 604, compute engine 502 generates and maintains (for example, in or with the assistance of storage engine 522), based on the received event data, a graph data structure ("the graph"). Each node in the graph represents a respective entity in the computing system and each edge in the graph that is connected to a node represents corresponding timestamped events involving the entity represented by the node. At block 606, the compute engine 502 creates for each node in the graph a respective array of values, wherein each value in the array represents a corresponding one of the edges in the graph connected to the node. Depending on the domain of interest, and the time period, the amount of activity or events associated with an entity represented by a node in the graph means the node may have tens, hundreds, or even thousands of edges connected to it, and thus the array of values may correspondingly include tens, hundreds, or even thousands of values.

At block 608, atypical events detection engine 514, during an inference workflow of a neural network model, obtains respective embedding vectors for each node in the graph. Each embedding vector comprises a plurality of embedding representation numerical values corresponding to a portion of the respective array of values for the node that span a unique portion of the time period of timestamped events involving the entity represented by the node. Depending on the size of the array of values, and the unique portion of the time period of timestamped events involving the entity represented by the node, the dimensionality of the embedding vector, i.e., the number of embedding representation numerical values in the embedding vector, can be quite large.

As an example, the array of values for a node may span a period of days, such as a period of five days: day 1 (the oldest day in the period of time), day 2 (the next oldest day in the period of time), day n−2 (the middle day in the period of time), day n−1 (the penultimate day in the period of time), and day n (the current or latest day in the period). A separate embedding vector comprising a plurality of representation numerical values is obtained for each distinct day, for a first node that represents a first entity. Thus, the first node representing the first entity has a first embedding vector comprising a plurality of representation numerical values that correspond to the array of values for the first node on day 1, a second embedding vector comprising a plurality of representation numerical values for day 2, a third embedding vector comprising a plurality of representation numerical values for day n−2, a fourth embedding vector comprising a plurality of representation numerical values for day n−1, and finally, a fifth embedding vector comprising a plurality of representation numerical values for day n. Similarly, all other nodes that represent entities in the graph each have a corresponding number of embedding vectors, one for each day over the period of five days, in this example.

In one embodiment, obtaining for each node in the graph the respective plurality of embedding vectors, each embedding vector comprising the plurality of embedding representation numerical values corresponding to the portion of the respective array of values for the node that span the unique portion of the time period of timestamped events involving the entity represented by the node, comprises obtaining for each node in the graph a respective plurality of embedding vectors, each embedding vector comprising a plurality of embedding representation numerical values corresponding to a portion of the respective array of values for the node that span one or more of a non-overlapping, a variable-length, a fixed-length, and an equal-length, portion of the time period of timestamped events involving the entity represented by the node. Thus, for example, while the example above involves multiple, non-overlapping, fixed-length time periods, each one day in length, it is appreciated that different ones of the multiple time periods may vary in length of time with respect to each other, or may overlap with one or more other different time periods to some extent, depending on the domain of interest, the node(s) involved, and the overall time period of interest.

At block 610, atypical events detection engine 514, during the inference workflow of the neural network model, measures a similarity in the embedding representation numerical values of one of the plurality of embedding vectors obtained for a node relative to the embedding representation numerical values of another one or more of the plurality of embedding vectors obtained for that same node. Continuing with the above example, the atypical events detection engine 514 compares the embedding representation numerical values of the embedding vector for day n obtained for a particular node and compares such to one or more of the embedding representation numerical values of the embedding vectors for days 1, 2, n−2 or n−1 obtained for the same node. Similarly, the atypical events detection engine 514 can measure the similarity between embeddings for another node, or all other nodes, in the graph. In one embodiment, measuring the similarity in the embedding representation numerical values of one of the plurality of embedding vectors obtained for a node relative to the embedding representation numerical values of another one or more of the plurality of embedding vectors obtained for the node, involves measuring a cosine similarity in the embedding representation numerical values of one of the plurality of embedding vectors obtained for the node relative to the embedding representation numerical values of another one or more of the plurality of embedding vectors obtained for the node. It is appreciated that other algorithms may be used to measure similarity between or among embedding vectors for a node.

At block 612, atypical events detection engine 514, or, alternatively, compute engine 502, can take some action with regard to the entity represented by a node responsive to the measured similarity in the embedding representation numerical values of the one of the plurality of embedding vectors obtained for the node relative to the embedding representation numerical values of the other one or more of the plurality of embedding vectors obtained for the node. Continuing with the above example, when the embedding representation numerical values of the embedding vector for day n obtained for a particular node vary widely compared to the one or more of the embedding representation numerical values of the embedding vectors for days 1, 2, n−2 or n−1 obtained for the same node, the atypical events detection engine can take some action with respect to the entity represented by that node. Similarly, the atypical events detection engine 514 can take action relating to one or more other entities represented by different nodes in the graph according to the same process.

Figure 7:
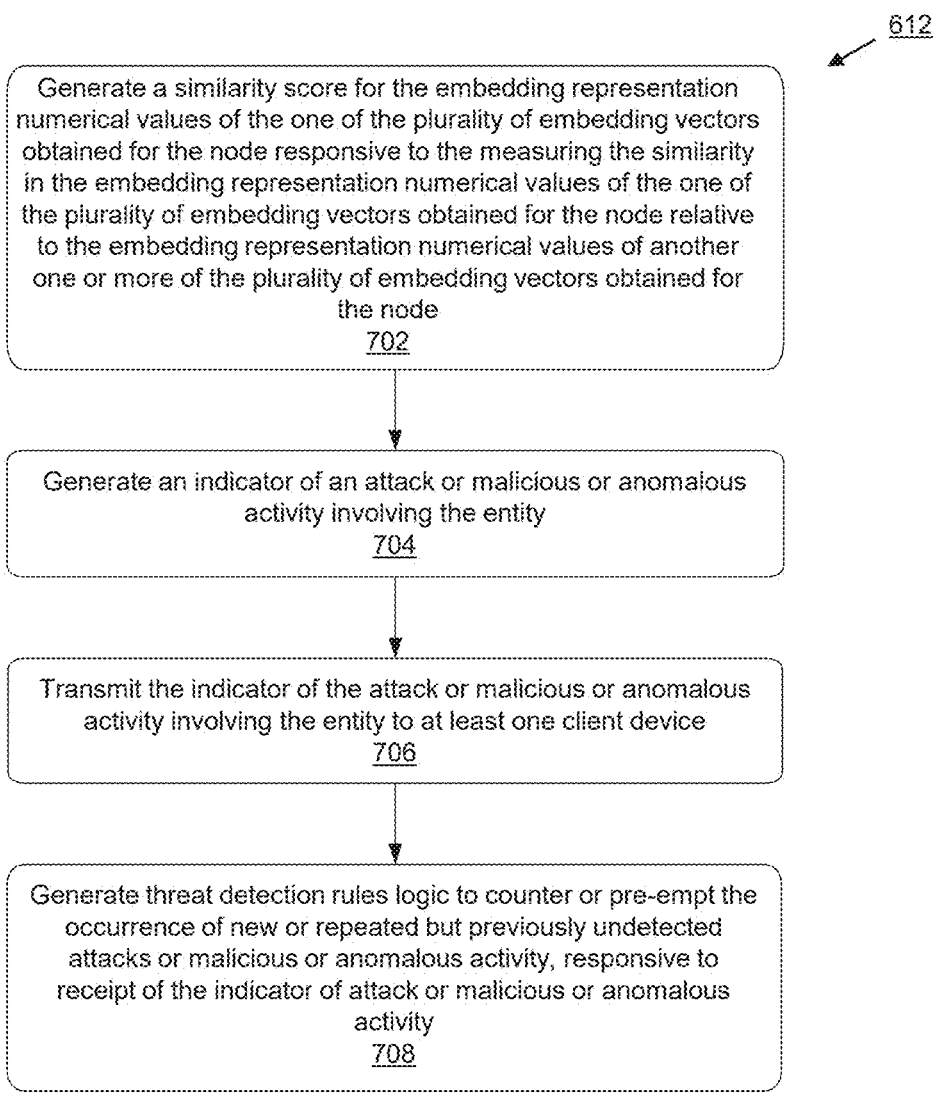
FIG. 7 illustrates a flowchart of certain aspects of a method to detect atypical events relating to an entity in a computing system according to example embodiments of the present disclosure.

With reference to FIG. 7, according to an embodiment, taking an action at block 612 with regard to an entity represented by a node responsive to the measured similarity in the embedding representation numerical values of the one of the plurality of embedding vectors obtained for the node relative to the embedding representation numerical values of the other one or more of the plurality of embedding vectors obtained for the node, can involve, at block 702, generating a similarity score for the embedding representation numerical values of the one of the plurality of embedding vectors obtained for the node responsive to the measuring of the similarity in the embedding representation numerical values of the one of the plurality of embedding vectors obtained for the node relative to the embedding representation numerical values of another one or more of the plurality of embedding vectors obtained for the node, and then taking an action with regard to the entity represented by the node responsive to the similarity score exceeding a threshold that indicates an atypical event involving the entity.

According to an embodiment, taking the action at block 612 with regard to an entity represented by a node responsive to the measured similarity in the embedding representation numerical values of the one of the plurality of embedding vectors obtained for the node relative to the embedding representation numerical values of the other one or more of the plurality of embedding vectors obtained for the node, can involve, at block 704, generating an indicator of an attack or malicious or anomalous activity involving the entity. According to this embodiment, the compute engine 502 or atypical events detection engine 514 at block 706 may transmit the indicator of the attack or malicious or anomalous activity involving the entity to one or more selected entities. The selected entities may include at least one client device 504, in which case, the client device at block 708 may generate threat detection rules logic to counter or pre-empt the occurrence of new or repeated but previously undetected attacks or malicious or anomalous activity, responsive to receipt of the indicator of attack or malicious or anomalous activity.

Figure 8:
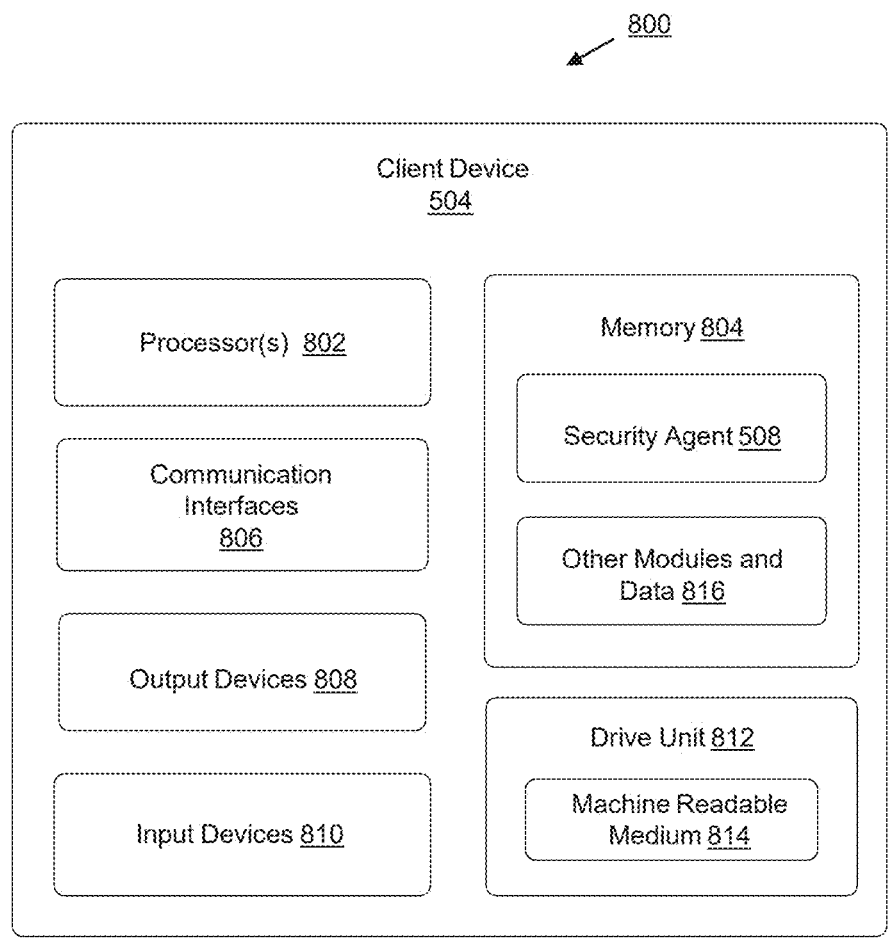
FIG. 8 illustrates an example system architecture for a client device.

FIG. 8 depicts an example system architecture 800 for a client device 504. A client device 504 can be one or more computing devices, such as a workstation, a personal computer (PC), a laptop computer, a tablet computer, a personal digital assistant (PDA), a cellular phone, a media center, an embedded system, a server or server farm, multiple distributed server farms, a mainframe, or any other type of computing device. As shown in FIG. 8, a client device 504 can include processor(s) 802, memory 804, communication interface(s) 806, output devices 808, input devices 810, and/or a drive unit 812 including a machine readable medium 814.

In various examples, the processor(s) 802 can be a central processing unit (CPU), a graphics processing unit (GPU), or both CPU and GPU, or any other type of processing unit. Each of the one or more processor(s) 802 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 802 may also be responsible for executing drivers and other computer-executable instructions for applications, routines, or processes stored in the memory 804, which can be associated with common types of volatile (RAM) and/or nonvolatile (ROM) memory.

In various examples, the memory 804 can include system memory, which may be volatile (such as RAM), non-volatile (such as ROM, flash memory, etc.) or some combination of the two. Memory 804 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the client device 504. Any such non-transitory computer-readable media may be part of the client device 504.

The memory 804 can store data, including computer-executable instructions, for a security agent 108 as described herein. The memory 804 can further store event data 518, and/or other data being processed and/or used by one or more components of the security agent 508, including event detectors 516, a compute engine 502, and a communication component 510. The memory 804 can also store any other modules and data 816 that can be utilized by the client device 504 to perform or enable performing any action taken by the client device 504 or in connection with one or more user accounts. For example, the modules and data can be a platform, operating system, and/or applications, as well as data utilized by the platform, operating system, and/or applications.

The communication interfaces 806 can link the client device 504 to other elements through wired or wireless connections. For example, communication interfaces 806 can be wired networking interfaces, such as Ethernet interfaces or other wired data connections, or wireless data interfaces that include transceivers, modems, interfaces, antennas, and/or other components, such as a Wi-Fi interface. The communication interfaces 806 can include one or more modems, receivers, transmitters, antennas, interfaces, error correction units, symbol coders and decoders, processors, chips, application specific integrated circuits (ASICs), programmable circuit (e.g., field programmable gate arrays), software components, firmware components, and/or other components that enable the client device 504 to send and/or receive data, for example to exchange event data 518, and/or any other data with the security network 506.

The output devices 808 can include one or more types of output devices, such as speakers or a display, such as a liquid crystal display. Output devices 808 can also include ports for one or more peripheral devices, such as headphones, peripheral speakers, and/or a peripheral display. In some examples, a display can be a touch-sensitive display screen, which can also act as an input device 810.

The input devices 810 can include one or more types of input devices, such as a microphone, a keyboard or keypad, and/or a touch-sensitive display, such as the touch-sensitive display screen described above.

The drive unit 812 and machine readable medium 814 can store one or more sets of computer-executable instructions, such as software or firmware, that embodies any one or more of the methodologies or functions described herein. The computer-executable instructions can also reside, completely or at least partially, within the processor(s) 802, memory 804, and/or communication interface(s) 806 during execution thereof by the client device 504. The processor(s) 802 and the memory 804 can also constitute machine readable media 814.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 6 and 7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method to identify an atypical event involving an entity in a computing system, comprising:
receiving event data comprising a plurality of time-stamped events involving a plurality of entities occurring over a time period;
maintaining, based on the received event data, a graph data structure ("the graph") in which each node in the graph represents a respective entity and in which a plurality of one or more edges and other nodes in the graph connected to a node represent a corresponding plurality of timestamped events involving the entity represented by the node;

creating for each node a respective array of values, wherein each value in the array represents a corresponding one of the plurality of one or more edges or other nodes in the graph connected to the node;

during an inference workflow of a neural network model,
obtaining for each node in the graph a respective plurality of embedding vectors, each embedding vector comprising a plurality of embedding representation numerical values corresponding to a portion of the respective array of values for the node that span a unique portion of the time period of timestamped events involving the entity represented by the node; and measuring a similarity in the embedding representation numerical values of one of the plurality of embedding vectors obtained for a node relative to the embedding representation numerical values of another one or more of the plurality of embedding vectors obtained for the node; and taking an action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node.

2. The method of claim 1, wherein the entity in the computing system is selected from a group of entities consisting of: a user login to the computing system, a user account in the computing system, a computing resource of the computing system, a cloud-based user account in a cloud-based computing system, a virtual computing resource in a cloud-based computing system, a network resource in a computing system or a cloud-based computing system, and a location of the entity in the computing system.

3. The method of claim 1, wherein receiving event data comprising the plurality of timestamped events involving the plurality of entities occurring over the time period comprises receiving, for each timestamped event in the event data, an entity identifier, an event identifier or event type identifier, and a corresponding timestamp at which the entity identified by the entity identifier was involved in an event identified by the event identifier or event type identifier.

4. The method of claim 1, wherein obtaining for each node in the graph the respective plurality of embedding vectors, each embedding vector comprising the plurality of embedding representation numerical values corresponding to the portion of the respective array of values for the node that span the unique portion of the time period of timestamped events involving the entity represented by the node, comprises obtaining for each node in the graph a respective plurality of embedding vectors, each embedding vector comprising a plurality of embedding representation numerical values corresponding a portion of the respective array of values for the node that span one or more of a non-overlapping, a variable-length, a fixed-length, and an equal-length, portion of the time period of timestamped events involving the entity represented by the node.

5. The method of claim 1, wherein measuring the similarity in the embedding representation numerical values of one of the plurality of embedding vectors obtained for the node relative to the embedding representation numerical values of another one or more of the plurality of embedding vectors obtained for the node, comprises measuring a cosine similarity in the embedding representation numerical values of one of the plurality of embedding vectors obtained for the node relative to the embedding representation numerical values of another one or more of the plurality of embedding vectors obtained for the node.

6. The method of claim 1, wherein taking the action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node, comprises:

generating a similarity score for the embedding representation numerical values of the one of the plurality of embedding vectors obtained for the node responsive to the measuring the similarity in the embedding representation numerical values of the one of the plurality of embedding vectors obtained for the node relative to the embedding representation numerical values of another one or more of the plurality of embedding vectors obtained for the node; and taking an action with regard to the entity represented by the node responsive the similarity score exceeding a threshold that indicates an atypical event involving the entity.

7. The method of claim 1, wherein taking the action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node, comprises generating an indicator of an attack or malicious or anomalous activity involving the entity.

8. The method of claim 7, further comprising:
transmitting the indicator of the attack or malicious or anomalous activity involving the entity to selected entities.

9. The method of claim 8, wherein the selected entities comprise at least one client device, the method further comprising the client device generating threat detection rules logic to counter or pre-empt the occurrence of new or repeated but previously undetected attacks or malicious or anomalous activity, responsive to receipt of the indicator of attack or malicious or anomalous activity.

10. A computer system, comprising:
one or more processors;
a memory to store computer-executable instructions that, when executed by the one or more processors, cause the one or more processors to identify an atypical event involving an entity in a computing system comprising:
receiving event data comprising a plurality of timestamped events involving a plurality of entities occurring over a time period;
maintaining, based on the received event data, a graph data structure ("the graph") in which each node in the graph represents a respective entity and in which a plurality of one or more edges and other nodes in the graph connected to a node represent a corresponding plurality of timestamped events involving the entity represented by the node;
creating for each node a respective array of values, wherein each value in the array represents a corresponding one of the plurality of one or more edges and other nodes in the graph connected to the node;

during an inference workflow of a neural network model, obtaining for each node in the graph a respective plurality of embedding vectors, each embedding vector comprising a plurality of embedding representation numerical values corresponding to a portion of the respective array of values for the node that span a unique portion of the time period of timestamped events involving the entity represented by the node; and measuring a similarity in the embedding representation numerical values of one of the plurality of embedding vectors obtained for a node relative to the embedding representation numerical values of another one or more of the plurality of embedding vectors obtained for the node; and taking an action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node.

11. The computer system of claim 10, wherein receiving event data comprising the plurality of timestamped events involving the plurality of entities occurring over the time period comprises receiving, for each timestamped event in the event data, an entity identifier, an event identifier or event type identifier, and a corresponding timestamp at which the entity identified by the entity identifier was involved in an event identified by the event identifier or event type identifier.

12. The computer system of claim 10, wherein obtaining for each node in the graph the respective plurality of embedding vectors, each embedding vector comprising the plurality of embedding representation numerical values corresponding to the portion of the respective array of values for the node that span the unique portion of the time period of timestamped events involving the entity represented by the node, comprises obtaining for each node in the graph a respective plurality of embedding vectors, each embedding vector comprising a plurality of embedding representation numerical values corresponding a portion of the respective array of values for the node that span one or more of a non-overlapping, a variable-length, a fixed-length, and an equal-length, portion of the time period of timestamped events involving the entity represented by the node.

13. The computer system of claim 10, wherein taking the action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node, comprises:

generating a similarity score for the embedding representation numerical values of the one of the plurality of embedding vectors obtained for the node responsive to the measuring the similarity in the embedding representation numerical values of the one of the plurality of embedding vectors obtained for the node relative to the embedding representation numerical values of another one or more of the plurality of embedding vectors obtained for the node; and taking an action with regard to the entity represented by the node responsive the similarity score exceeding a threshold that indicates an atypical event involving the entity.

14. The computer system of claim 10, wherein taking the action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node, comprises generating an indicator of an attack or malicious or anomalous activity involving the entity.

15. The computer system of claim 14, further comprising:

transmitting the indicator of the attack or malicious or anomalous activity involving the entity to selected entities, wherein the selected entities comprise at least one client device; and generating, at the client device, threat detection rules logic to counter or pre-empt the occurrence of new or repeated but previously undetected attacks or malicious or anomalous activity, responsive to receipt of the indicator of attack or malicious or anomalous activity.

16. One or more non-transitory computer-readable media storing computer-executable instructions that, when executed by one or more processors, cause the one or more processors to identify an atypical event involving an entity in a computing system comprising:

receiving event data comprising a plurality of timestamped events involving a plurality of entities occurring over a time period;

maintaining, based on the received event data, a graph data structure ("the graph") in which each node in the graph represents a respective entity and in which a plurality of one or more edges and other nodes in the graph connected to a node represent a corresponding plurality of timestamped events involving the entity represented by the node;

creating for each node a respective array of values, wherein each value in the array represents a corresponding one of the plurality of one or more edges and other nodes in the graph connected to the node;

during an inference workflow of a neural network model, obtaining for each node in the graph a respective plurality of embedding vectors, each embedding vector comprising a plurality of embedding representation numerical values corresponding to a portion of the respective array of values for the node that span a unique portion of the time period of timestamped events involving the entity represented by the node; and measuring a similarity in the embedding representation numerical values of one of the plurality of embedding vectors obtained for a node relative to the embedding representation numerical values of another one or more of the plurality of embedding vectors obtained for the node; and taking an action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node.

17. The one or more non-transitory computer-readable media of claim 16, wherein receiving event data comprising the plurality of timestamped events involving the plurality of entities occurring over the time period comprises receiving, for each timestamped event in the event data, an entity identifier, an event identifier or event type identifier, and a corresponding timestamp at which the entity identified by the entity identifier was involved in an event identified by the event identifier or event type identifier.

18. The one or more non-transitory computer-readable media of claim 16, wherein obtaining for each node in the graph the respective plurality of embedding vectors, each embedding vector comprising the plurality of embedding representation numerical values corresponding to the portion of the respective array of values for the node that span the unique portion of the time period of timestamped events involving the entity represented by the node, comprises obtaining for each node in the graph a respective plurality of embedding vectors, each embedding vector comprising a plurality of embedding representation numerical values corresponding a portion of the respective array of values for the node that span one or more of a non-overlapping, a variable-length, a fixed-length, and an equal-length, portion of the time period of timestamped events involving the entity represented by the node.

19. The one or more non-transitory computer-readable media of claim 16, wherein taking the action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node, comprises:

generating a similarity score for the embedding representation numerical values of the one of the plurality of embedding vectors obtained for the node responsive to the measuring the similarity in the embedding representation numerical values of the one of the plurality of embedding vectors obtained for the node relative to the embedding representation numerical values of another one or more of the plurality of embedding vectors obtained for the node; and taking an action with regard to the entity represented by the node responsive the similarity score exceeding a threshold that indicates an atypical event involving the entity.

20. The one or more non-transitory computer-readable media of claim 16, wherein taking the action with regard to the entity represented by the node responsive to the measured similarity in the embedding representation numerical values of the one of the plurality of embedding vectors obtained for the node relative to the embedding representation numerical values of the other one or more of the plurality of embedding vectors obtained for the node, comprises:

generating an indicator of an attack or malicious or anomalous activity involving the entity;

transmitting the indicator of the attack or malicious or anomalous activity involving the entity to selected entities, wherein the selected entities comprise at least one client device; and generating, at the client device, threat detection rules logic to counter or pre-empt the occurrence of new or repeated but previously undetected attacks or malicious or anomalous activity, responsive to receipt of the indicator of attack or malicious or anomalous activity.

* * * * *